US007423400B2

(12) United States Patent
Chinsen et al.

(10) Patent No.: US 7,423,400 B2
(45) Date of Patent: Sep. 9, 2008

(54) SYSTEM AND METHOD FOR CONTROLLING VELOCITY AND DETECTING OBSTRUCTIONS OF A VEHICLE LIFT GATE

(75) Inventors: Jason Chinsen, Brantford (CA); Thomas P. Frommer, Mount Albert (CA); Tomasz T. Dominik, Toronto (CA); Reginald C. Grills, Oshawa (CA)

(73) Assignee: Flextronics Automotive Inc., Ontario (CA)

( * ) Notice: Subject to any disclaimer, the term of this patent is extended or adjusted under 35 U.S.C. 154(b) by 0 days.

(21) Appl. No.: 11/471,563

(22) Filed: Jun. 21, 2006

(65) Prior Publication Data

US 2008/0007191 A1 Jan. 10, 2008

(51) Int. Cl.
*H02P 3/00* (2006.01)

(52) U.S. Cl. ...................... 318/466; 318/280; 318/445; 318/468

(58) Field of Classification Search ......... 318/280–283, 318/446, 466, 443, 445, 430, 469; 296/146.4, 296/76; 43/339
See application file for complete search history.

(56) References Cited

U.S. PATENT DOCUMENTS 5,039,925 A 8/1991 Schap
5,681,990 A 10/1997 Hampo et al.
6,584,428 B1 6/2003 Irle et al.
6,600,285 B2 * 7/2003 Mintgen et al. ............. 318/468
6,719,356 B2 4/2004 Cleland et al.
6,909,253 B2 * 6/2005 Ogura ......................... 318/430
7,071,644 B2 * 7/2006 Kawanobe .................. 318/280
7,151,350 B2 * 12/2006 Haag et al. .................. 318/280
7,156,447 B2 * 1/2007 Watanabe ................ 296/146.4
2001/0035725 A1 * 11/2001 Mintgen et al. ............. 318/445
2002/0040551 A1 * 4/2002 Zhou ........................... 49/339
2002/0084668 A1 * 7/2002 Yamagishi et al. ............ 296/76
2003/0115803 A1 6/2003 Kidokoro
2004/0070355 A1 * 4/2004 Ogura ......................... 318/280
2004/0124662 A1 * 7/2004 Cleland et al. ........... 296/146.4
2004/0212334 A1 * 10/2004 Kawanobe .................. 318/280
2006/0137248 A1 6/2006 Ichinose

FOREIGN PATENT DOCUMENTS

WO WO/2002/087812 11/2002

* cited by examiner

*Primary Examiner*—Paul Ip
(74) *Attorney, Agent, or Firm*—Patton Boggs LLP

(57) ABSTRACT

A system and method for controlling a rotational closure system, such as a lift gate, of a vehicle may include sensing an angle of the rotational closure system, generating a drive signal, driving a drive mechanism with the drive signal to output a mechanical force for moving the rotational closure system, generating an angle signal having a digital pulse-width modulation form with a duty cycle based on the angle of the rotational closure system, feeding back the angle signal, and, in response to the feedback angle signal, altering the drive signal while the drive mechanism is moving the rotational closure system between open and closed positions. In one embodiment, the angle signal is generated from a location disposed on the rotational closure system. A controller mounted to the rotational closure system may include an angle sensor and be configured to receive and process the angle signal to drive the drive mechanism.

34 Claims, 10 Drawing Sheets

SYSTEM AND METHOD FOR CONTROLLING VELOCITY AND DETECTING OBSTRUCTIONS OF A VEHICLE LIFT GATE

BACKGROUND OF THE INVENTION

Vehicles have become more and more automated to accommodate the desires of consumers. Vehicle parts, including windows, sun roofs, seats, sliding doors, and lift gates (e.g., rear latches and trunks) have been automated to enable users to press a button on the vehicle or on a remote control to automatically open, close, or otherwise move the vehicle parts.

While these vehicle parts may be automatically controlled, the safety of consumers and objects is vital. An obstacle, such as a body part or physical object, that obstructs a vehicle part while closing could be damaged or crushed, or the vehicle part or drive mechanism could be damaged, if the obstacle is not detected while the vehicle part is moving.

In the case of detecting obstacles in the path of an automatic lift gate or other closure system, one conventional technique for speed control and sensing an obstacle has been to use Hall Effect sensors or optical vane interrupt sensors. The Hall Effect sensors or optical vane interrupt sensors are positioned in a motor or on a mechanical drive train. Sensor signals are generated by the rotation of the motor giving velocity to the drive mechanism. The sensor signals can be used to detect a change in velocity and to allow for speed control and obstacle detection. This sensing technique is generally known as an indirect sensing technique.

One problem with the use of Hall Effect sensors and optical vane interrupt sensors is a result of mechanical backlash due to system flex and unloaded drive mechanism conditions. As an example, when a lift gate is closing, the gate reaches a point where the weight of the lift gate begins to close the lift gate without any additional effort from the drive mechanism. In fact, at this point, the drive mechanism applies effort to the lift gate to prevent premature closing. This is a state when negative energy is imparted from the drive mechanism to the lift gate. In order to detect an obstacle at this point, the drive mechanism must transition from a negative energy state to a positive energy state. Once the transition to the positive energy state occurs, a controller of the drive mechanism can then detect a change in the velocity of the drive mechanism, thus detecting a collision with an obstacle. The controller may then signal the motor to change direction. The obstacle detection process may take hundreds of milliseconds to complete, which is too long to detect a sudden movement of the lift gate and long enough to cause injury to a person or damage to an object, vehicle part, or drive mechanism. As a result, obstacle detection is very difficult at the end of travel when sensitivity to obstacles should be the highest to avoid damaging obstacles or damaging the vehicle part.

SUMMARY OF THE INVENTION

To provide for improved speed control and obstacle detection of a rotational closure system, such as a lift gate, of a vehicle, the principles of the present invention provide for a direct sensing technique. The direct sensing technique senses an absolute position of the rotational closure system rather than sensing a motor or drive mechanism. In one embodiment, the system includes a motor having electrical contacts to receive drive signals and configured to move the rotational closure system of the vehicle between an open and a closed position in response to the drive signals. A controller may have electrical outputs electrically coupled to the electrical contacts of the motor and electrical inputs to receive feedback signals. The system may further include an angle sensor coupled to the rotational closure system and electrically coupled to the electrical inputs of the controller, where the controller generates a drive signal to drive the motor and the angle sensor generates an angle signal having a digital pulsewidth modulation form with a duty cycle based on the angle of the rotational closure system. The angle signal may be fed back to the controller via the electrical inputs of the controller and operable to cause the controller to alter the drive signal to change output of the motor while moving the rotational closure system between the open and closed positions. In one embodiment, the motor is a hydraulic pump. The controller may include a processor configured to determine if an obstacle is obstructing movement of the rotational closure system based on the angle signal.

A method for controlling position of the rotational closure system may include sensing an angle of the rotational closure system of the vehicle, generating a drive signal, driving a motor with the drive signal to output a mechanical force for moving the rotational closure system, generating an angle signal having a digital pulsewidth modulation form with a duty cycle based on the angle of the rotational closure system, feeding back the angle signal, and in response to the fedbeck angle signal, altering the drive signal to change output of the motor while moving the rotational closure system between the open and closed position.

DETAILED DESCRIPTION OF THE PRESENT INVENTION

Direct measurement differs from indirect measurement in that direct measurement of a rotational closure system is derived from monitoring a signal that is produced by a sensor attached directly to the rotational closure system (e.g., lift gate) of the vehicle. The sensor may feed back a signal directly to a controller used to control the position and velocity of the lift gate and perform obstacle detection. The controller may further utilize the feedback signal to provide for increased obstacle detection sensitivity.

Moreover, direct measurement creates an intelligent system that knows the position of the rotational closure system being sensed regardless of the circumstances. Unlike the indirect incremental measurement that needs to establish its location at the beginning of operation, the direct measurement technique creates a knowledge of the rotational closure system location before, during, and after a move operation. This is accomplished by establishing an absolute position with respect to the sensor outputs. As a result, the direct measurement technique provides increased sensitivity at the end of travel of the rotational closure system when closing and reduces wear and tear on a system. The direct measurement technique further provides the system with the foresight of knowing a final position of the rotational closure system prior to actual movement.

Figure 1A:
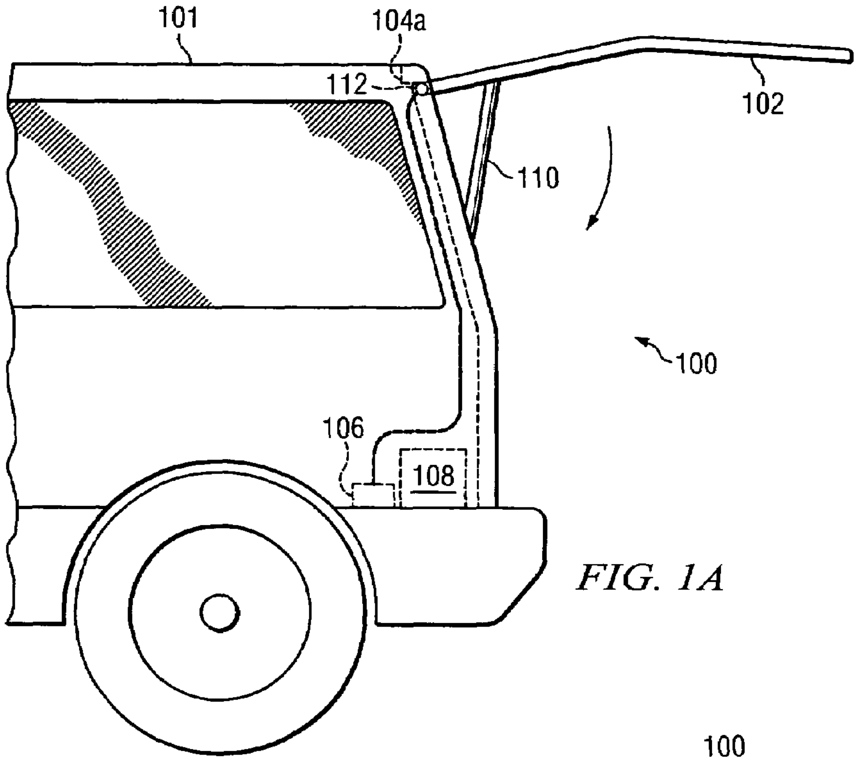
FIG. 1A is an illustration showing a side view of a backend of a vehicle with a lift gate in an open position.

FIG. 1A is an illustration showing a side view of a backend of a vehicle 100 with a lift gate 102 in an open position. The vehicle 100 includes a vehicle body 101 and lift gate 102 coupled to the vehicle body 101 by a hinge 112. A rotary flex shaft encoder 104*a* may be mounted to the hinge 112. As the lift gate 102 opens, the hinge 112 rotates, thereby causing the encoder 104*a* to rotate and generate a digital pulse or pulse-width modulation (PWM) signal. In one embodiment, the encoder may be mounted to the vehicle body (e.g., ceiling) of the vehicle 100. Although FIG. 1A shows and describes a lift gate, it should be understood that the principles of the present invention may be applied to any rotational closure system, such as a trunk or lift gate. Reference to the lift gate is for exemplary purposes and constitutes one of many possible embodiments, configurations, and applications in accordance with the principles of the present invention.

A controller 106 may be mounted within the vehicle 100. The encoder 104*a* may be electrically coupled to the controller 106 and signals produced by the encoder in response to the lift gate 102 opening and closing may be communicated to the controller 106. A motor 108, such as an motor 108 or other drive mechanism (e.g., pneumatic pump), which may also be mounted within the vehicle 100, may be electrically coupled to the controller 106. The motor 108 may have contacts (not shown) for being electrically in communication with the controller 106 to receive a drive signal for controlling operation of the motor 108. Although a motor is shown and described in FIG. 1B, it should be understood that the principles of the present invention may be applied to any drive mechanism, such as a hydraulic motor, pneumatic motor, or electromechanical motor, as understood in the art. Reference to the motor is for exemplary purposes and constitutes one of many possible embodiments, configurations, and applications in accordance with the principles of the present invention.

A cylinder 110 may be mounted between the vehicle body 101 and lift gate 102. The cylinder 110 may be used to open and close the lift gate 102 by the motor 108 forcing and draining fluid, such as air, for example, into and out of the cylinder 110, as understood in the art.

Figure 1C:
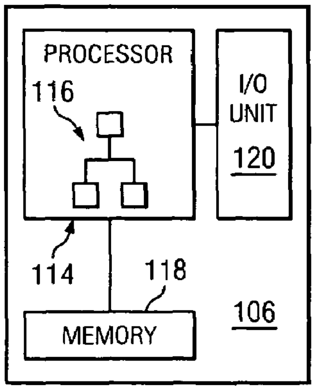
FIG. 1C is a block diagram of an exemplary controller having a processor executing software for driving a rotational closure system in accordance with the principles of the present invention.
Figure 1B:
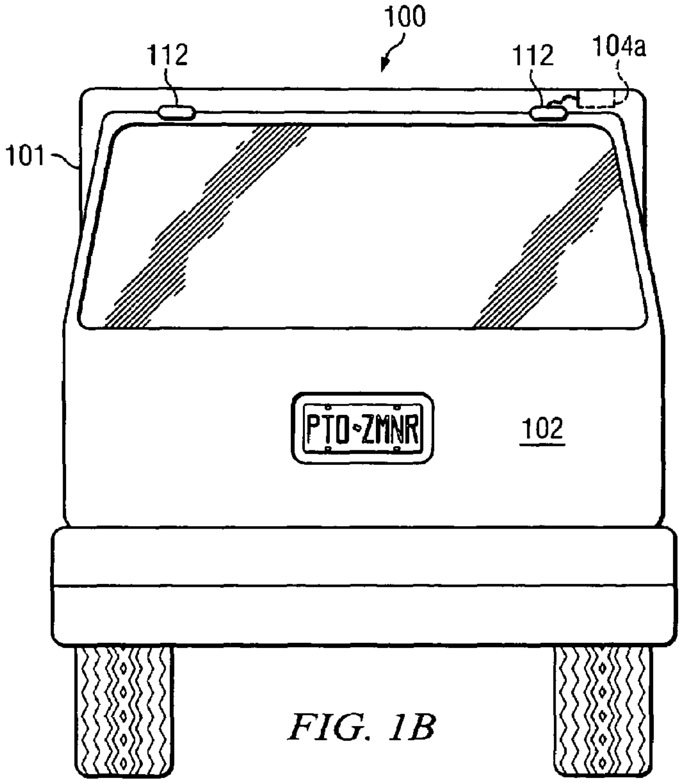
FIG. 1B is an illustration of a rear view of the vehicle.

FIG. 1B is an illustration of a rear view of the vehicle 100. As shown, the encoder 104*a* may be mounted to the vehicle body 101 to sense rotation of the hinge 112 when the lift gate 102 is opened and closed. At least a portion of the encoder 104*a* may be mounted axially with the hinge 112 to be rotated.

FIG. 1C is a block diagram of an exemplary controller 106 having a processor 114 executing software 116. The processor may be in communication with memory 118 for storing information, such as the program 116 and data used by the program, for example, and an input/output (I/O) unit 120. As the encoder 104*a* generates an angle signal having a PWM form, the I/O unit 120 receives the angle signal and communicates it to the processor 114 for processing via the software 116. The angle signal may be a digital PWM signal. In addition, the software 116 generates a drive signal and may generate a compensation signal based on the angle signal to be utilized to alter the drive signal for controlling velocity and sensing obstacles during movement of the lift gate 102 utilizing a position, velocity, acceleration, and/or force controller, as understood in the art. The I/O unit 120 may be part of the processor 114 itself or be separate electronic components configured to drive a motor to drive the lift gate 102 (FIG. 1A) to a desired position.

Figure 2A:
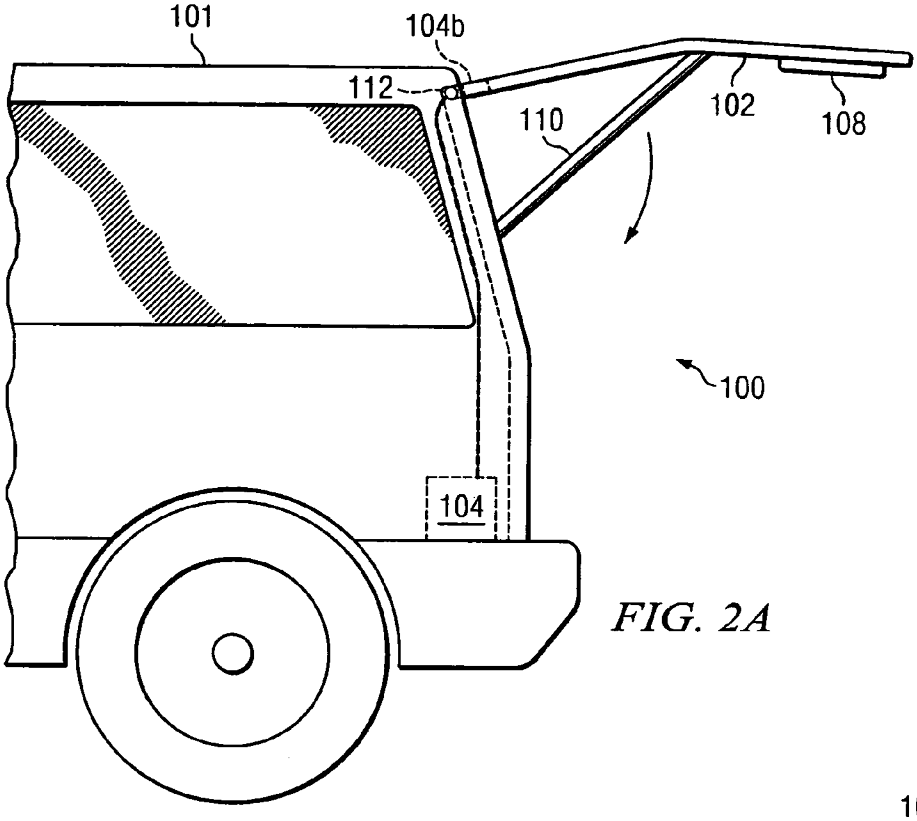
FIG. 2A is an illustration of the vehicle of FIG. 1 configured to control velocity of the rotational closure system and to sense an obstacle obstructing movement of the rotational closure system in accordance with the principles of the present invention.

FIG. 2A is an illustration of the vehicle of FIG. 1A configured to control velocity of a rotational closure system, such as a lift gate 102, and sense an obstacle obstructing movement of the rotational closure system in accordance with the principles of the present invention. Rather than using the encoder 104*a* (FIG. 1A), an analog angle sensor 104*b* may be utilized in accordance with the principles of the present invention. The analog angle sensor 104*b* may be mounted to the rotational closure system away from the hinge 112 (i.e., no portion being in axial alignment with or coupled to the hinge). In addition, the motor 108 may be attached to the rotational closure system. In such a configuration, the controller 104 may be electrically coupled to a drive mechanism, such as the motor 108, by the use of wires (not shown) or wireless communication. As described with regard to FIG. 1C, the control module 106 may drive the motor 108 with a drive signal that may be based on an angle signal produced by the analog angle sensor 104*b*.

Figure 2B:
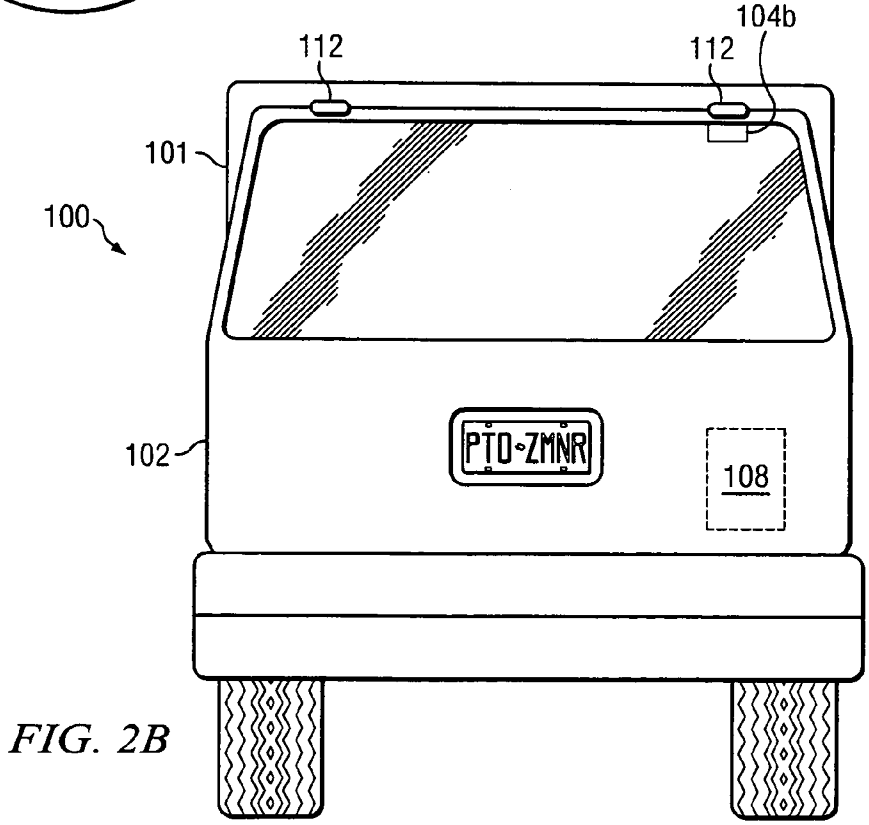
FIG. 2B is an illustration of the vehicle of FIG. 2A.

FIG. 2B is an illustration of the vehicle 100 of FIG. 2A. As shown, the analog angle sensor 104*b* may be coupled to the lift gate 102 away from the hinge 112. It should be understood that the analog angle sensor 104*b* may be positioned anywhere on the lift gate 102 and be oriented in a position relative to the vehicle body 101 such that the control module 106 (FIG. 2A) knows the absolute angle of the lift gate 102.

Figure 3:
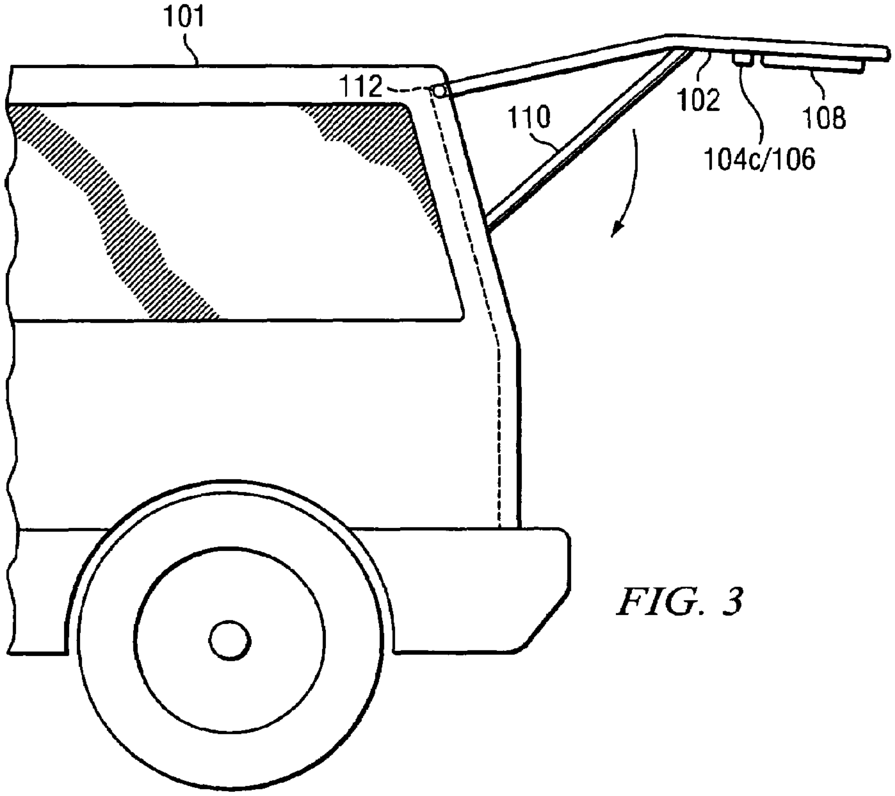
FIG. 3 is an illustration of the vehicle of FIG. 1A having another configuration by controlling velocity and detecting an obstacle in accordance with the principles of the present invention.

FIG. 3 is an illustration of the vehicle 100 of FIG. 1A having another configuration for controlling velocity and detecting an obstacle in accordance with the principles of the present invention. In this configuration, an angle sensor 104*c* may be mounted on a control module 106. The control module 106 may be disposed on (i.e., directly or indirectly coupled to) the lift gate 102. The angle sensor 104*c* may produce an angle signal having a PWM form with a duty cycle corresponding to an angle of the angle sensor 104*c*. As previously described, the control module 106 receives the angle signal having a PWM form from the angle sensor 104*c* and drives the motor 108 with a drive signal adjusted based on the angle signal to control the lift gate 102 while opening and closing.

Figure 4:
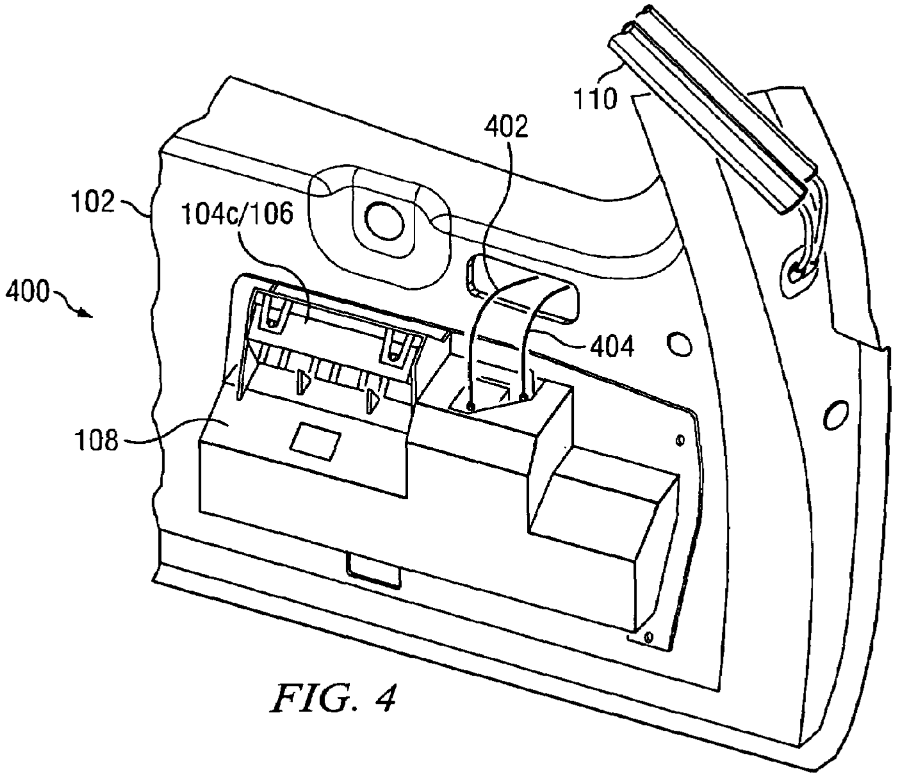
FIG. 4 is an illustration of an inside view of the rotational closure system in accordance with the configuration of FIG. 3.

FIG. 4 is an illustration of an inside view of the lift gate 102 in accordance with the configuration of FIG. 3. As shown, the angle sensor 104*c* and control module 106 are disposed on the lift gate 102. Additionally, the motor 108 (FIG. 1) is coupled to the cylinder 110 via an input line 402 and return line 404 to drive fluid to and from the cylinder for opening and closing the lift gate 402.

Figure 5:
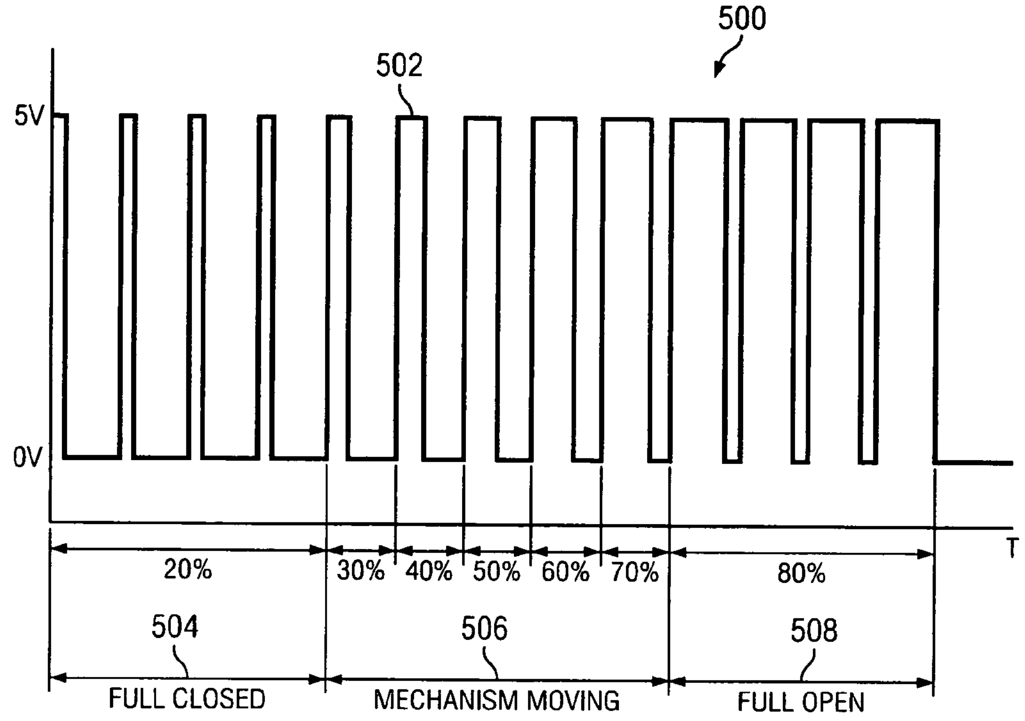
FIG. 5 is a graph showing an exemplary angle signal having a pulsewidth modulation form.

FIG. 5 is a graph showing an exemplary angle signal having a pulsewidth modulation form. An angle signal 502 having a PWM form is shown during three time periods, a full closed time period 504, moving time period 506, and full open time period 508. While a lift gate is in the full close time period 504, a duty cycle (i.e., ratio of on to off time) is 20 percent. When the lift gate transitions between full close to full open during the moving time period 506, the duty cycle increases accordingly. As shown, the duty cycle increases to 30 percent all the way to 80 percent. When the lift gate is in a full open position in the full open time period 508, the duty cycle is at 80 percent. It should be understood that the lift gate may be moved between the open and closed positions without reaching either the full open or full close position in accordance with the principles of the present invention.

Figure 6:
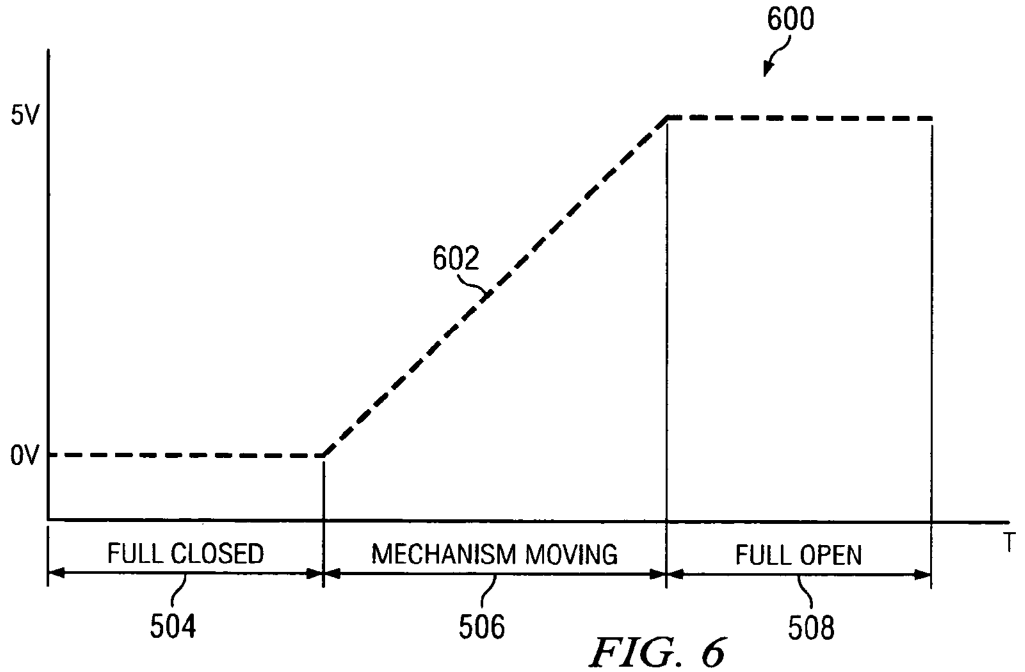
FIG. 6 is a graph showing an exemplary angle signal in an analog form.

FIG. 6 is a graph showing an exemplary angle signal 602 in an analog form. The angle signal 602 is zero volts when a lift gate is in a full closed position at the full closed time period 504 (corresponding with the full closed time period of FIG. 5). During the moving time period 506, the lift gate transitions from the full closed position to a full opened position and the angle signal shows a ramp from about zero volts to about five volts as sensed by an analog sensor (FIG. 2B). However, it should be understood that the voltage range can be configured and often ranges from 0.5 volts to 4.5 volts for diagnostic purposes. At the full open time period 508, the lift gate is the fully open position and the analog signal remains at five volts.

Figure 7:
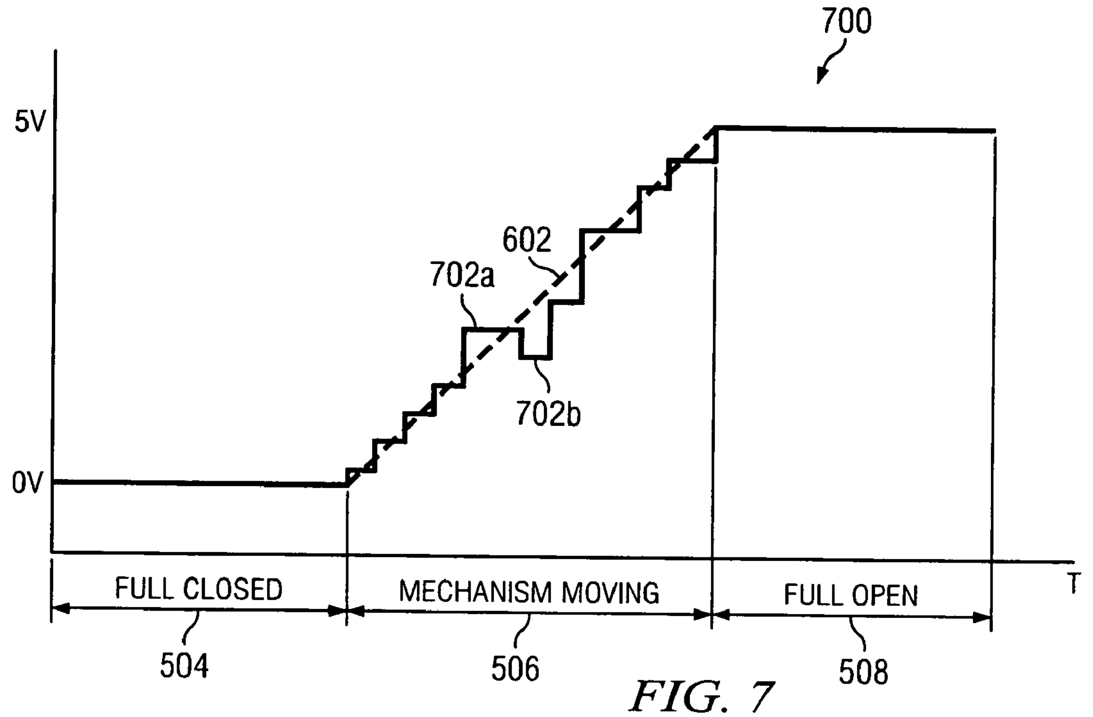
FIG. 7 is a graph showing the angle signal of FIG. 6 with a digitized signal overlay.

FIG. 7 is a graph showing the angle signal of FIG. 6 with a digitized signal overlay. Although an analog sensor can generate a signal that changes as the lift gate changes position as shown in FIG. 6, a controller must utilize an analog-to-digital (A/D) converter to convert the analog signal into a digital signal for a processor to use the angle signal information in controlling speed of the lift gate and perform obstacle detection. However, as shown in FIG. 7, the A/D conversion process demonstrates that an A/D converter may generate two different analog values, but convert them to the same digital value, regardless of how much movement the lift gate actually underwent. Likewise, two separate values 702*a* and 702*b* may be generated from the same analog signal, thus reporting two distinct positions even if the lift gate has not moved. This problem can be addressed by increasing the resolution of a decoder so that it can distinguish between small differences in the analog signal. However, these incorrect decoded digital values may still occur, but they may be less frequent.

Figure 8:
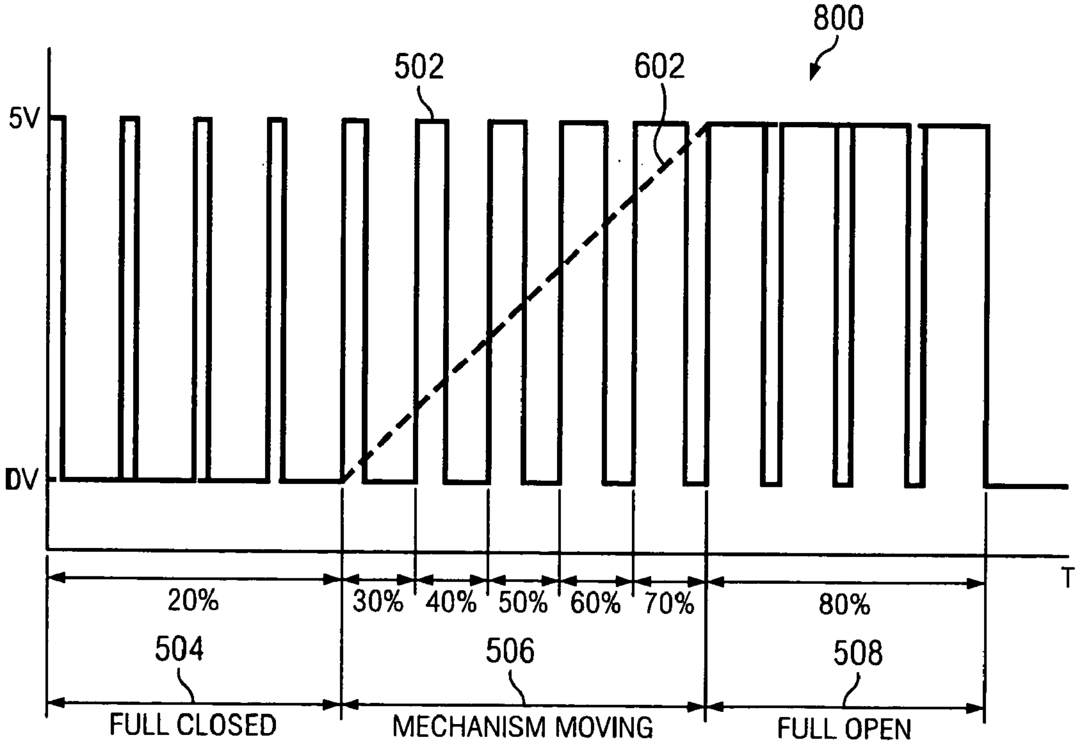
FIG. 8 is a graph showing the angle signal having an analog form of FIG. 6 with the angle signal having a pulsewidth modulation form of FIG. 5 overlaying the analog signal.

FIG. 8 is a graph showing the angle signal having an analog form of FIG. 6 with the angle signal having a pulsewidth modulation form of FIG. 5 overlaying the analog signal. As shown, an angle signal 502 having a PWM form (FIG. 5) may track an angle signal 602 (FIG. 6) having an analog form. Because the angle signal is digital in the PWM form case, the controller is less susceptible to error.

Figure 9:
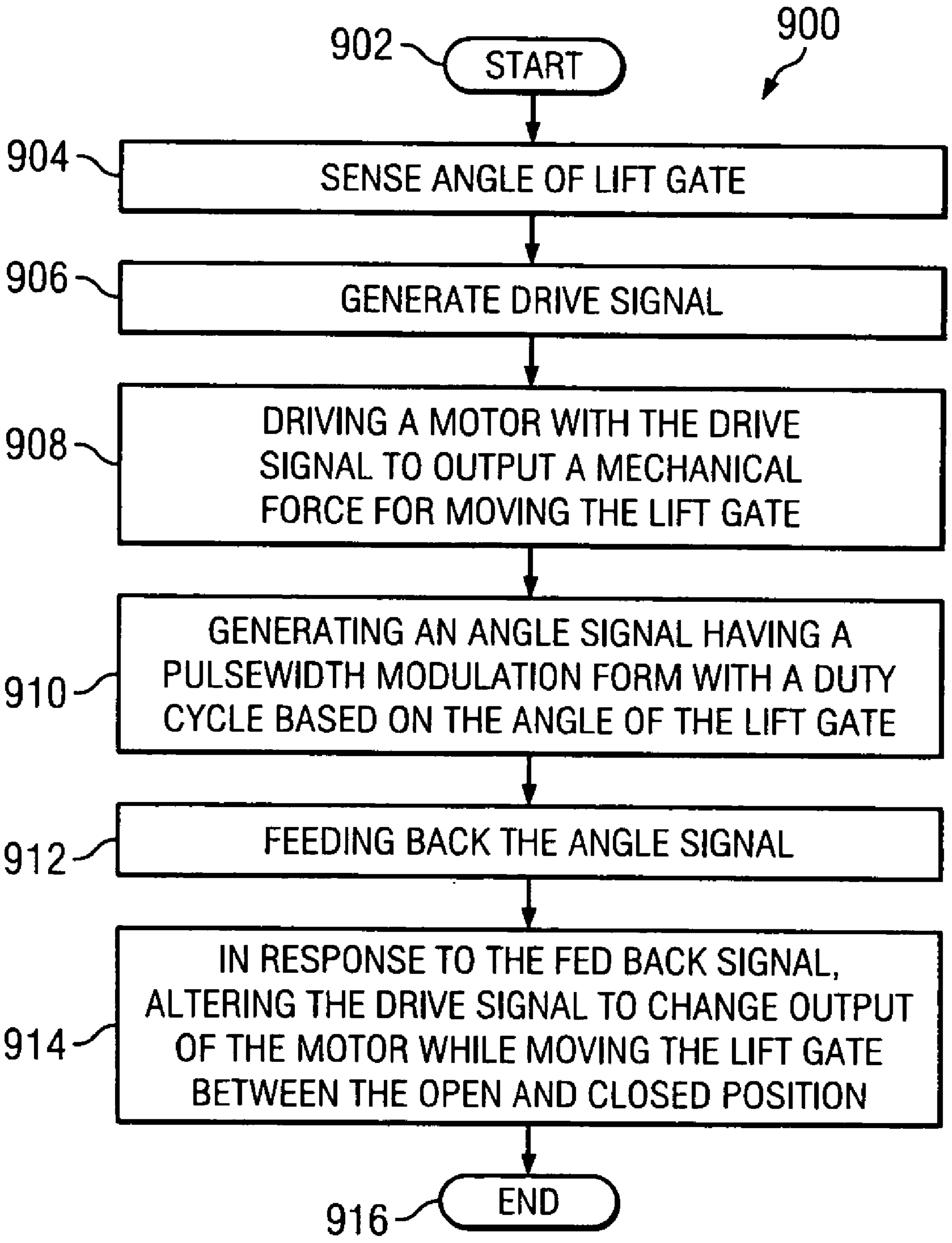
FIG. 9 is a flow chart of an exemplary process for determining whether an obstacle is obstructing movement of the rotational closure system.

FIG. 9 is a flow chart of an exemplary process for determining whether an obstacle is obstructing movement of the lift gate. The control process starts at step 102. At step 904, an angle of the lift gate is sensed when moving between an open and closed position. At step 906, a controller may generate a drive signal for driving a motor to move the lift gate. At step 908, the motor is driven with the drive signal to output a mechanical force for moving the lift gate. An angle signal having a pulsewidth modulation form with a duty cycle based on the angle of the lift gate may be generated at step 910. The angle signal may be fedback to a controller at step 912. In response to the fedback angle signal, the drive signal may be altered to change output of the motor while the motor is moving the lift gate between the open and closed position at step 914. The controller may utilize a position and/or speed control algorithm as understood in the art. Altering the drive signal may include (i) increasing or decreasing the value of the drive signal to increase or decrease the speed of the lift gate, (ii) reversing the drive signal to change direction of the lift gate, or (iii) maintaining the drive signal at a fixed value to stop or release the lift gate to be in a manual mode. The process ends at step 916.

Figure 10A:
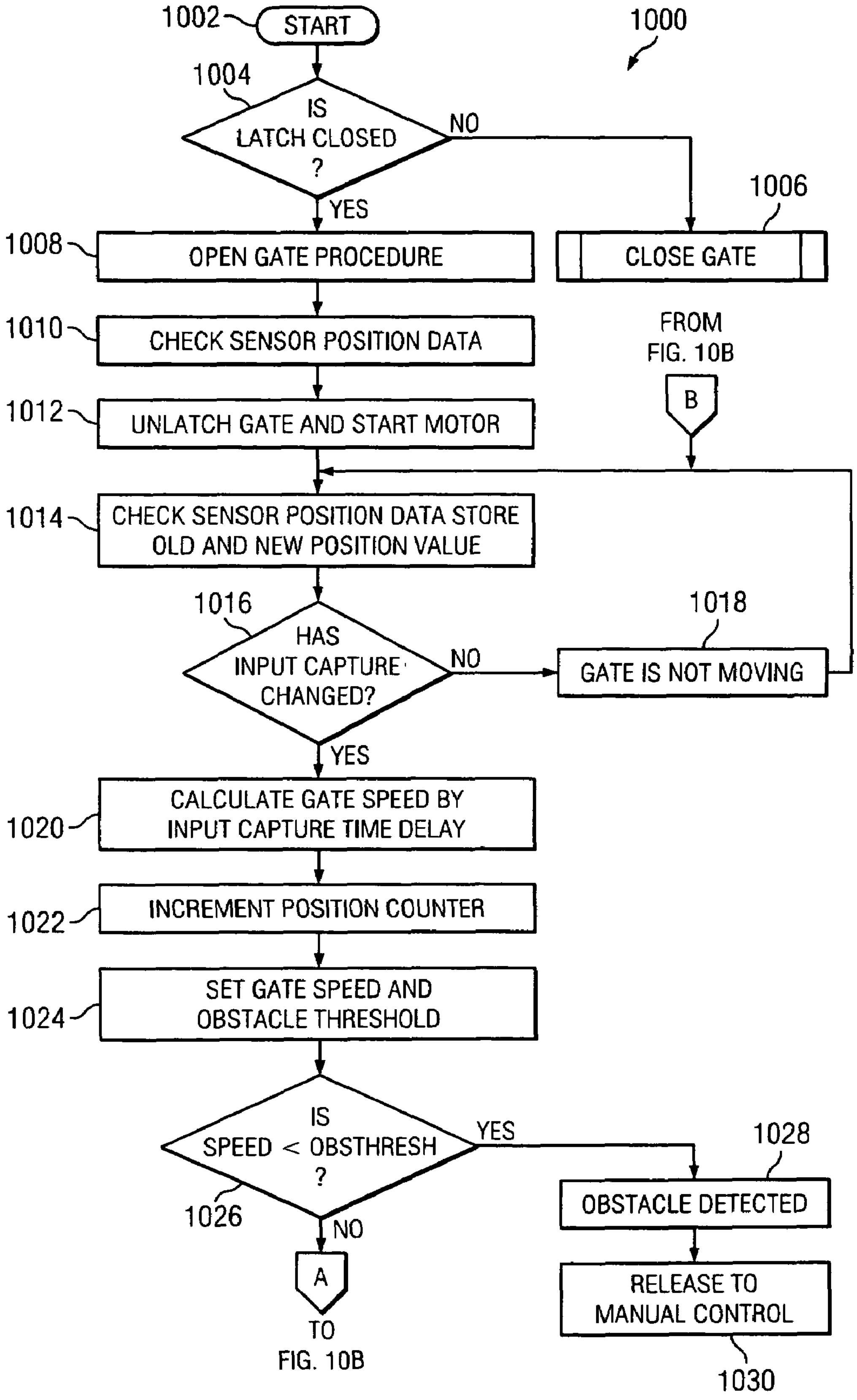
FIGS. 10A and 10B (collectively FIG. 10) are flow charts of an exemplary process for controlling opening of the rotational closure system to the gate.
Figure 10B:
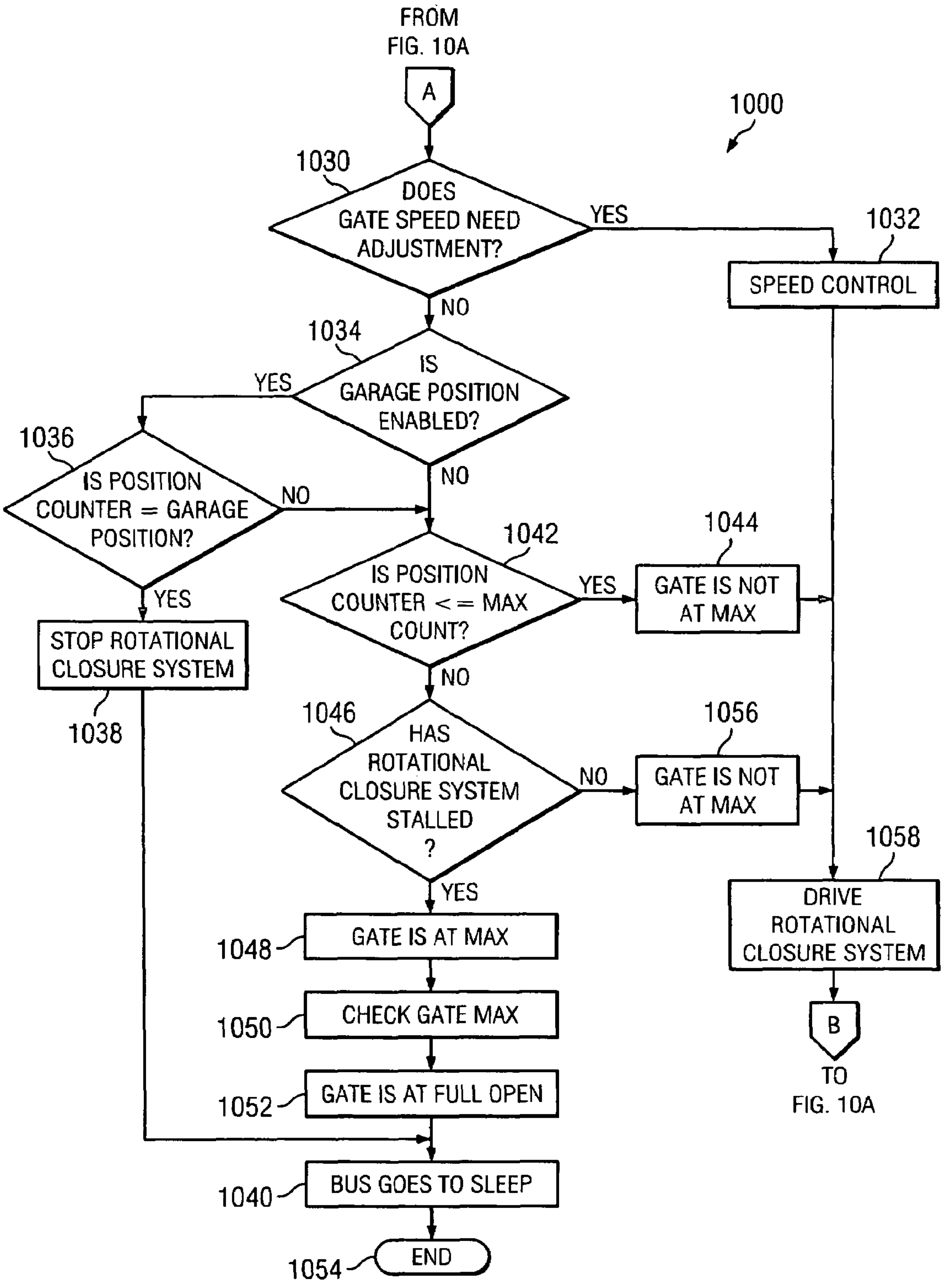

FIG. 10 is a flow chart of an exemplary process 1000 for controlling the lift gate to move the gate into an open position. The process 1000 starts at step 1002. At step 1004, a determination is made as to whether a latch for maintaining the lift gate is closed. If the latch is not closed, then a processor executing software for the process 1000 runs a procedure to close the lift gate at step 1006. If it was determined at step 1004 that the latch is closed, then at step 1008, the processor begins an open lift gate procedure. Because the principles of the present invention may be applied to any rotational closure system, the process 1000 for controlling the lift gate may be the same or similar when used to control other rotational closure systems.

At step 1010, the processor checks position data of a sensor. In accordance with the principles of the present invention, the sensor data provides absolute position information of the lift gate. For example, the position data may include angle information in accordance with the embodiment shown in FIG. 3 and be in a pulsewidth modulation form. At step 1012, the lift gate is unlatched and a motor for moving the lift gate is started. The sensor position data is checked, old position data is stored, and new position data is received. At step 1016, a determination is made as to whether the sensor position data has changed from a last position to a new position. If not, then at step 1018, it is determined that the gate is not moving and the process returns to step 1014 to check the sensor position data again. In the event that the lift gate continues not to move, a timeout procedure may be initiated, whereby the process may enter a manual mode. Other procedures may additionally and/or alternatively be executed in response to the lift gate not moving.

If at step 1016 it is determined that the sensor position data has changed, then at step 1020 a gate speed is calculated by using an input capture time delay between the new position and the old position (e.g., two milli-inches per milli-second). At step 1022, a position counter is incremented to maintain absolute position knowledge of the lift gate. At step 1024, gate speed and obstacle thresholds are set. If at step 1026 it is determined that the gate speed is less than the obstacle threshold, then at step 1028, it is determined that an obstacle is impeding movement of the lift gate. At step 1030, the process releases the lift gate to be manually controlled. In releasing the lift gate to be in manual control, the process may stop the lift gate from further opening so that the obstacle is not crushed or damaged. If at step 1026 it is determined that the speed of the lift gate is greater than or equal to the obstacle threshold, then a determination is made at step 1030 as to whether the lift gate speed needs adjustment. This decision is based on the actual speed of the lift gate to maintain a constant speed of the lift gate while opening. At step 1032, speed control is performed to increase or decrease the speed of the lift gate. If the lift gate speed does not need adjustment, then at step 1034, a determination is made as to whether a garage position is enabled. The garage position means the lift gate is to be raised only to a certain height to avoid the lift gate from hitting a ceiling within a garage. If at step 1034 it is determined that a garage position is enabled, then a determination is made at step 1036 as to whether the position counter is equal to the garage position. If so, then at step 1038, the motor moving the lift gate is stopped. At step 1040, a bus for driving the motor goes to sleep to reduce energy consumption.

If at either steps 1034 or 1036 either determination results in the negative, then at step 1042, a determination is made as to whether the position counter is less than or equal to a maximum count. If it is determined at step 1042 that the position counter is less than or equal to a maximum count, then a determination is made that the lift gate is not at a maximum at step 1044. If it is determined at step 1042 that the position counter is greater than the maximum count, a determination is made at step 1046 as to whether the drive mechanism or motor has stalled. If it is determined that the motor has stalled, then at step 1048, a determination is made that the lift gate is at a maximum position. At step 1050, a check of the gate maximum is made and it is determined at step 1052 that the lift gate is at a full open position. The process continues at step 1040 to put the bus to sleep to save energy. The process ends at step 1054 after the system bus is put to sleep after either the motor has stalled as determined at step 1046 or the position of the lift gate has been determined to be in a garage position at step 1036 and the motor stopped at step 1038.

If, however, at step 1046 it is determined that the motor has not stalled, then it is determined at step 1056 that the lift gate is not at a maximum. At step 1058, the processor executing the software for the process 1000 continues to drive the motor at step 1058. The motor is also driven in response to a determination being made at step 1030 that the lift gate needs speed adjustment and the speed control is performed at step 1032. After the motor is driven by an updated drive signal being applied to the motor at step 1058, the process continues at step 1014 where the sensor position data is checked, the old sensor data position is stored, and a new sensor position data value is obtained. The process continues until it is determined that the speed of the lift gate is such that an obstacle is detected, the lift gate reaches a garage position (if a garage position is set), or the lift gate reaches a maximum open position.

Figure 11A:
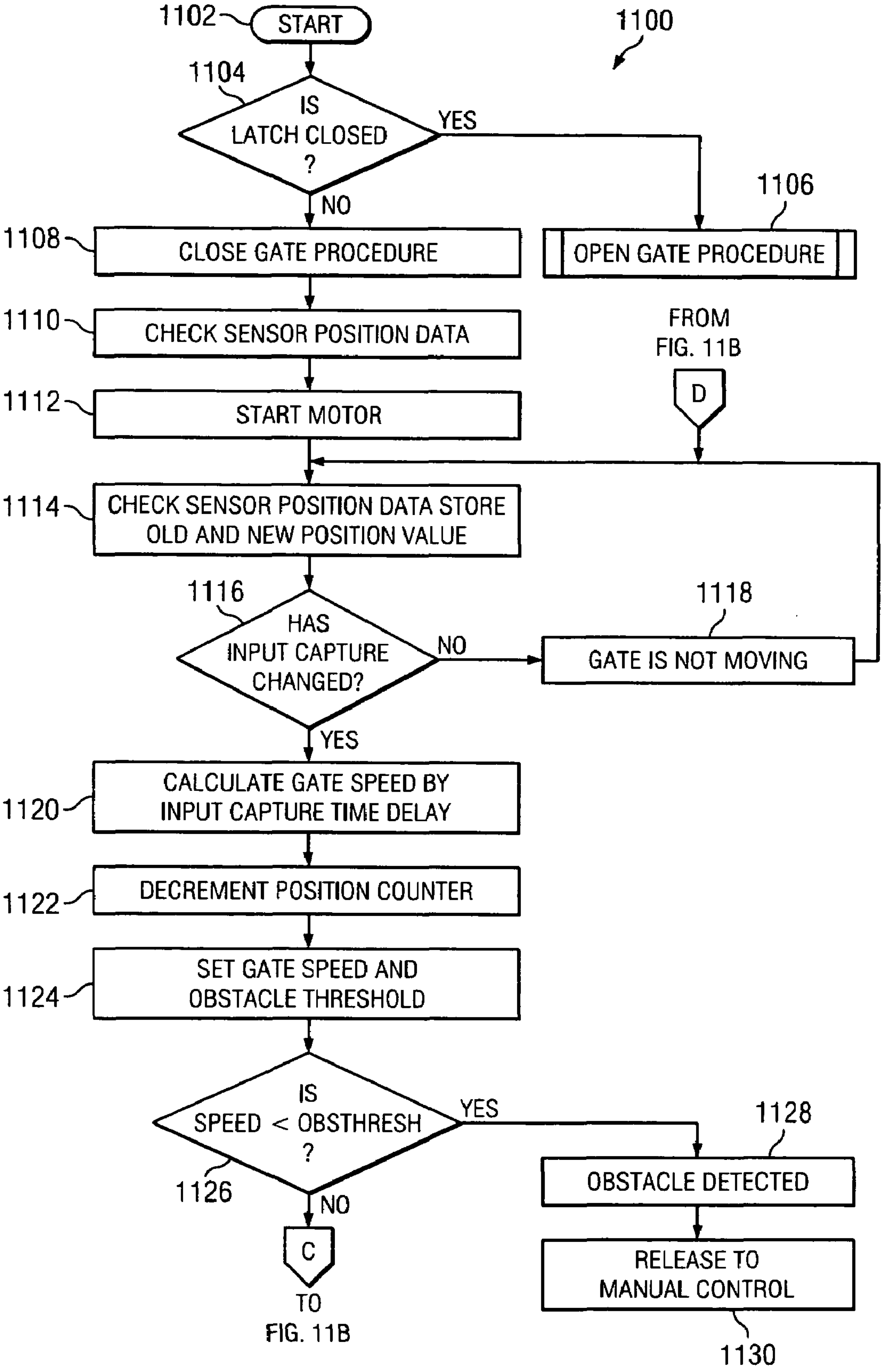
FIGS. 11A and 11B (collectively FIG. 11) are flow charts of an exemplary process for controlling closing of the rotational closure system.
Figure 11B:
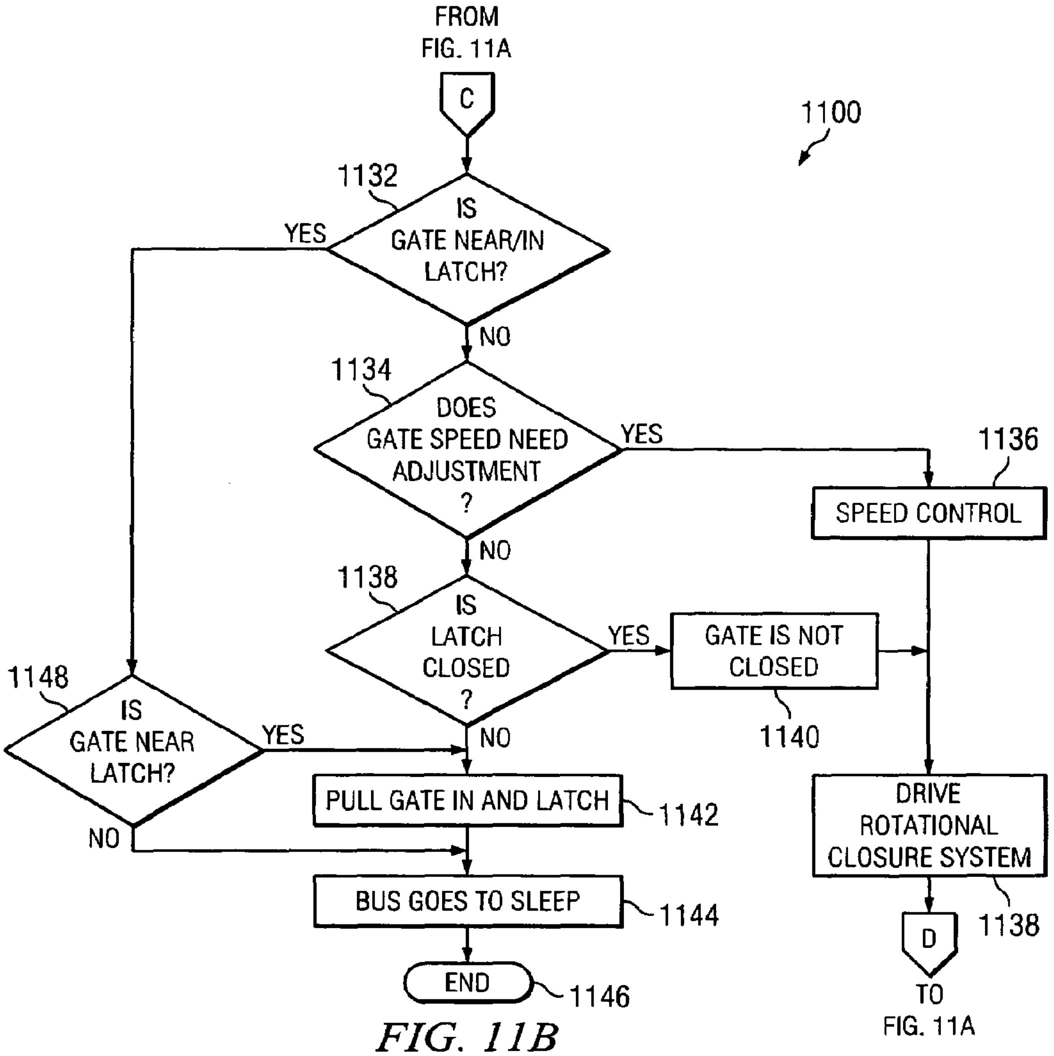

FIG. 11 is a flow chart of an exemplary process for controlling the lift gate starting in an open position. The gate position close process 1100 starts at step 1102. At step 1104, a determination is made as to whether a latch for maintaining the lift gate in a closed position is closed. If it is determined that the latch is closed, then at step 1106, an open gate procedure is performed. If it is determined that the latch is not closed at step 1104, then the process continues at step 1108 to start a close lift gate procedure.

At step 1110, sensor position data is checked and the motor is started at step 1112. At step 1114, the process 1100 checks sensor position data, stores old sensor position data, and obtains new position sensor data. At step 1116, a determination is made as to whether the new sensor position data has changed from the last stored sensor position data. If the data has not changed, then it is determined at step 1118 that the lift gate is not moving. The process continues back at step 1114, where the process may default into a manual mode or otherwise.

If at step 1116 it is determined that the lift gate sensor position data has changed, then at step 1120, lift gate speed is calculated by the distance the lift gate has moved over the time between sensing constructive positions of the lift gate. At step 1122, a position counter is decremented to maintain knowledge of absolute position of the lift gate. At step 1124, lift gate speed and optical thresholds are set.

At step 1126, a determination is made as to whether the lift gate speed is less than the obstacle threshold. If the lift gate speed is less than the obstacle threshold, then at step 1128, an obstacle is detected to be obstructing movement of the lift gate. The lift gate may be released to a manual control at step 1130, and a motor moving the lift gate may be stopped or reversed to avoid damage to the obstacle, injury to a person, or damage to the lift gate or its drive system.

If it is determined at step 1126 that the speed of the lift gate is not less than the obstacle threshold, then at step 1132, a determination is made as to whether the lift gate is near or in a latch used to secure the lift gate in a closed position. If the lift gate is not near or in the latch, then a determination is made at step 1134 as to whether the lift gate speed needs adjustment. If so, then at step 1136, speed control is performed to adjust the speed of the lift gate to be faster or slower. The process continues at step 1138, where the motor driving the lift gate is commanded by a drive signal. The process continues at step 1114.

If at step 1134 it is determined that the lift gate speed does not need adjustment, then at step 1138, a determination is made as to whether the latch is not closed If it is determined that the latch is not closed, then it is determined at step 1140 that the gate is not in a closed position and a drive signal is sent to the motor to continue driving the lift gate at step 1138. If it is determined at step 1138 that the latch is closed then at step 1142, the lift gate is pulled in and latched at step 1142. The process 1100 continues at step 1144, where the bus for driving the motor is put to sleep to save energy and avoid further movement of the lift gate or latch. The process ends at step 1146.

If at step 1132 it is determined that the lift gate is near or in the latch, then at step 1148, a determination is made as to whether the lift gate is near the latch. If at step 1148 it is determined that the lift gate is near the latch, then at step 1142, the lift gate is pulled in and latched at step 1142. However, if it is determined at step 1148 that the lift gate is not near the latch, then the bus is put to sleep at step 1144. When the bus is put to sleep when the lift gate is still open, the controller may default to a manual mode. When the bus goes to sleep, the controller may be in a "low power" mode, where the controller relinquishes control of the gate until someone activates it again. It should be understood that alternative embodiments may be utilized to control the rotational closure system in both control and manual modes.

The principles of the present invention provide for a direct measurement system that uses an angle sensor that generates an angle signal having pulsewidth modulation with a duty cycle corresponding to the angle of a lift gate for providing feedback signaling of an absolute position of the lift gate. One embodiment utilizes a hydraulic pump mounted on the lift gate. A controller may be mounted to the lift gate and the angle sensor mounted to a circuit board of the controller to receive feedback of the position of the lift gate from the angle sensor to control speed and determine whether an obstacle is obstructing movement of the lift gate. It should be understood that other embodiments are contemplated that perform the same or similar function using the same or equivalent configuration as described above.

We claim:

1. A system for controlling a rotational closure system of a vehicle, said system comprising:

a drive mechanism having electrical contacts to receive a drive signal to cause said drive mechanism to move a rotational closure system of a vehicle between an open and a closed position in response to the drive signal;

a controller having electrical outputs electrically coupled to the electrical contacts of said drive mechanism and electrical inputs to receive feedback signals; and an angle sensor disposed on the rotational closure system and electrically coupled to the electrical inputs of said controller, said controller generating a drive signal to drive said drive mechanism and said angle sensor generating an angle signal having a digital pulsewidth modulation form with a duty cycle based on the angle of the rotational closure system, the angle signal being fed back to said controller via the electrical inputs and operable to cause said controller to alter the drive signal while said drive mechanism is moving the rotational closure system between the open and closed positions.

2. The system according to claim 1, wherein said drive mechanism includes a motor.

3. The system according to claim 1, wherein said controller includes a circuit board to which said angle sensor is coupled.

4. The system according to claim 1, wherein said controller includes a processor executing a software program that alters the drive signal in response to the angle signal received from said angle sensor.

5. The system according to claim 4, wherein the software program is configured to determine if an obstacle is obstructing movement of the rotational closure system based on the angle signal.

6. The system according to claim 5, wherein if the program determines that an obstacle is obstructing the rotational closure system, then the controller transitions to a manual control mode to enable the rotational closure system to be manually controlled.

7. The system according to claim 1, wherein said angle sensor is positioned on the rotational closure system and not coupled to a hinge coupling the rotational closure system and the vehicle.

8. The system according to claim 1, wherein said angle sensor is mounted to a hinge coupling the rotational closure system and the vehicle.

9. The system according to claim 1, wherein the rotational closure system is a lift gate.

10. A method for controlling a rotational closure system of a vehicle, said method comprising:

sensing an angle of the rotational closure system of the vehicle;

generating a drive signal;

driving a drive mechanism with the drive signal to output a mechanical force for moving the rotational closure system;

generating an angle signal having a digital pulsewidth modulation form with a duty cycle based on the angle of the rotational closure system;

feeding back the angle signal; and in response to the feedback angle signal, altering the drive signal while the drive mechanism is moving the rotational closure system between the open and closed positions.

11. The method according to claim 10, wherein said generating the angle signal is generated from a location disposed on the rotational closure system.

12. The method according to claim 10, further comprising determining if an obstacle is obstructing movement of the rotational closure system based on the angle signal.

13. The method according to claim 12, wherein if it is determined that an object is obstructing the rotational closure system, then the drive signal is transitioned to enable manual control of the rotational closure system.

14. The method according to claim 12, wherein if it is determined that an object is obstructing the rotational closure system, then the drive signal is transitioned to stop or reverse the rotational closure system.

15. The method according to claim 10, wherein said feeding back of the angle signal is fed back to a position on the rotational closure system.

16. The method according to claim 15, wherein said feeding back is performed within a controller configured to perform said sensing and altering.

17. A vehicle having a lift gate, comprising:

a vehicle body;

a rotational closure system;

at least one hinge coupling said rotational closure system to said vehicle body;

a drive mechanism configured to move said rotational closure system relative to said vehicle body;

a controller outputting a drive signal to drive said drive mechanism to move said rotational closure system; and an angle sensor disposed on said rotational closure system and operable to output an angle signal having a digital pulsewidth modulation form with a duty cycle based on an angle of the rotational closure system.

18. The vehicle of claim 17, wherein said controller includes said angle sensor, said controller being attached to said rotational closure system.

19. The vehicle of claim 18, wherein said controller includes a circuit board to which said angle sensor is attached.

20. The vehicle of claim 17, wherein said drive mechanism includes a motor.

21. The vehicle of claim 17, wherein said controller includes a processor configured to receive the angle signal and alter the drive signal based on the angle signal.

22. The vehicle according to claim 21, wherein the processor is further configured to determine if an obstacle is obstructing movement of said rotational closure system based on the angle signal.

23. The vehicle according to claim 22, wherein the processor is further configured to change between an automatic drive mode and a manual mode if an obstacle is determined to be obstructing movement of said rotational closure system.

24. The vehicle according to claim 22, wherein the processor is further configured to stop or reverse the rotational closure system if it is determined that an object is obstructing the rotational closure system.

25. The vehicle according to claim 17, wherein said rotational closure system is a lift gate.

26. A controller for controlling position of a rotational closure system, said controller comprising:

a processor configured to receive a digital pulsewidth modulation signal representative of an angle of the rotational closure system;

software executable by said processor, said software configured to generate a drive signal and compensation signal in response to the digital pulsewidth modulation signal, said software further configured to compensate the drive signal using the compensation signal to control movement of the rotational closure system; and an input/output unit configured to communicate the compensated drive signal to a drive mechanism for driving the rotational closure system to a desired position.

27. The controller according to claim 26, wherein said software includes a summer into which the drive signal and compensation signal are inputted to generate the compensated drive signal.

28. The controller according to claim 26, further comprising a housing configured to be mounted to the vehicle.

29. The controller according to claim 28, wherein said housing is configured to be mounted to the lift gate of the vehicle.

30. The controller according to claim 26, further comprising an angle sensor in communication with said processor.

31. The controller according to claim 26, wherein said software is further configured to determine if the rotational closure system is obstructed and (i) change between an automatic drive mode and a manual mode if an obstacle is determined to be obstructing movement of the rotational closure system.

32. The controller according to claim 26, wherein said software is further configured to determine if the rotational closure system is obstructed and stop or reverse movement of the rotation closure system.

33. The controller according to claim 26, wherein the rotational closure system is a lift gate.

34. The controller according to claim 26, wherein the controller is mounted to a vehicle to control the rotational closure system of the vehicle.

* * * * *